United States Patent [19]
Frey

[11] 3,932,039
[45] Jan. 13, 1976

[54] PULSED POLARIZATION DEVICE FOR MEASURING ANGLE OF ROTATION

[75] Inventor: Donald G. Frey, Ellicott City, Md.

[73] Assignee: Westinghouse Electric Corporation, Pittsburgh, Pa.

[22] Filed: Aug. 8, 1974

[21] Appl. No.: 495,757

[52] U.S. Cl. ............... 356/138; 356/152; 356/114; 350/159; 250/225
[51] Int. Cl.² ........................ G01C 1/00; G01J 4/00
[58] Field of Search ........... 356/138, 150, 151, 141, 356/152, 114–119; 250/225, 231 SE; 350/159

[56] References Cited
UNITED STATES PATENTS

| | | | |
|---|---|---|---|
| 3,316,799 | 5/1967 | Daley et al. | 250/225 |
| 3,474,255 | 10/1969 | White | 356/114 |
| 3,604,811 | 9/1971 | McMenmin | 356/117 |

Primary Examiner—Vincent P. McGraw
Assistant Examiner—Jon W. Henry
Attorney, Agent, or Firm—D. Schron

[57] ABSTRACT

An electro-optical system is disclosed for measuring rotational angle. The system includes a radiation source and reference linear polarizer in combination with a plurality of linear target polarizers. Photosensors are arranged to receive modulated light separately from an adjacent pair of target polarizers. Pulsed electrical output signals representative of the modulated light received by the photosensors are generated. Means are provided for comparing output signals from the sensors and generating a signal representative of rotational angle between the reference and target. The angle of rotation between the reference linear polarizer and the target linear polarizers is thereby converted to a representative signal which may be used to drive a servo motor or other device operatively connected to a rotatable element directly or indirectly. The reference polarizer may be held in a fixed position or it may be mounted on an independently rotatable element.

Angle measurement systems herein disclosed may be used in servo loops, as follow-up control devices or angle measurement pick-off applications. Devices controlled by an operator head motion can be used for hand-free control of machines, tools, weapon systems, or radar antenna positioning systems. Because mechanical linkages are not required between most elements of the system, systems according to the present invention are especially useful for remote optically-coupled sensing and control systems.

20 Claims, 18 Drawing Figures

PULSED POLARIZATION DEVICE FOR MEASURING ANGLE OF ROTATION

BACKGROUND OF THE INVENTION

1. Field of the Invention

This invention relates to angle transducers. In particular, it relates to an electro-optical means for measuring the rotational angle of one or more devices or to detect relative angular displacement between elements.

2. Description of the Prior Art

Transducers which function to convert amount and direction of rotational movement to electrical signals are particularly desirable for measurement and control. Various systems are known for detecting rotary movement and providing an electrical output proportional to the relative motion of two mechanical elements, such as shafts or the like. Prior art devices of the synchro type or of the type generating a series of pulses to be counted are known; however, these are bulky and relatively expensive.

Remote or optically-coupled rotational angle sensor systems presently available ordinarily employ space triangulation measurement techniques. These methods require simultaneous solutions to three-dimensional geometrical equations and involve use of extensive computer circuitry for obtaining the desired measurement. Rotational measurement in a single plane becomes a complex operation requiring much equipment when using this method. Angle measurement devices which are mechanically or electrically coupled to a rotating mechanism, such as used in servo loop follow-up or pick-off applications, are in frequent use.

The known types of angle rotation sensors can be replaced in many cases with an optically coupled measurement device described herein.

Previous techniques for sensing rotary angular position and for providing a reference input signal to system electronics, have required either direct electro-mechanical couplings to the rotary device or extensive computer mechanization for deriving position through optical triangulation methods. Optical measuring systems are available which utilize crossed linear polarizers for the purpose of detecting angle rotation. Various photoelectric, semiconductor or photosensitive elements are used for converting electromagnetic energy to a representative signal.

Typical prior art rotation detectors which employ crossed polarizers require careful matching of two or more sensors. In U.S. Pat. No. 3,474,255, a shaft mounted system employs two light polarizers angularly displaced by 90° on one shaft. A third polarizer is mounted on another shaft. Light received by photocells from each of the displaced polarizers is converted to a current or voltage differential. The displacement or error signal is then used to drive a servo motor to keep the two shafts synchronized.

In U.S. Pat. No. 3,306,159, a polarizing sheet attached to a rotary member is illuminated by non-polarized light. A set of four orthogonally related polarizing filters have four associated photosensors. These sensors are connected in a bridge circuit which provides an output signal whose phase angle is representative of the rotation angle of the rotary member.

Angular measurement devices employing polarized radiation are also disclosed in U.S. Pat. Nos. 2,998,746 and 3,521,071.

SUMMARY OF THE INVENTION

A rotational angle measurement system has been discovered which provides pulsed electrical output signals which are a measure of angular alignment of reference and target axes. This system is based upon the principle that the amplitude of the electromagnetic waves transmitted through a series of linear polarizers varies as the square of the cosine of the included angle between the axes of polarization. Disclosed herein is a system for measuring rotational angle which includes a suitable radiation means, such as a pulsed light-emitting diode (l.e.d.) and comprises means for directing electromagnetic waves having random polarization along a plurality of paths. A plurality of corresponding sensors is adapted to receive the electromagnetic waves separately along these paths and provides pulsed electrical signals representative of modulated radiation. A first polarizer means is mounted transverse to the wave paths. A plurality of second polarizer means is provided. An adjacent pair of linear polarizer sheets is angularly disposed with relation to polarization direction axes of adjacent polarizers. The second polarizer means includes first and second analyzers disposed to each other at a fixed angle greater than 0° and less than 90°. Means is provided for comparing pulsed electrical signals from the plurality of sensors and generating a signal representative of the rotational angle. A remote target can be compared to the rotational angle of a fixed index or movable reference.

DESCRIPTION OF THE PREFERRED EMBODIMENTS

Throughout the specification reference will be made primarily to the use of light as the radiation source with particular emphasis on visible light and near infrared as preferred embodiments of the invention. It is understood that other portions of the electromagnetic spectrum can be used within the inventive concept.

This sytem pertains to an angle of rotation measurement apparatus based upon Malus' Principle that the amount of light transmitted through two linear polarizers mounted transversely of an optical path varies as the square of the cosine of the included angle $\theta$ between the axes of polarization. It is well-known to those skilled in the art that crossed polarizers modulate the light transmitted commonly therethrough as a function of the rotational angle between the mechanical axes of the two linear polarizers. For instance, by rotating one linear polarizer through an angle of 90° with respect to the other polarizer, the amount of light passing through both can be modulated from a minimum to a maximum amount.

The system is based upon Malus' Principle which can be shown to have the form:

$$T = K_1 + K_2 \cos 2\theta,$$

where $T$ is light transmittance of two parallel linear sheet polarizers having polarization axes with an included angle between them of $\theta$, and $K_1$ and $K_2$ are transmission constants characteristic of the polarizing material.

Figures 1, 2A, 2B:
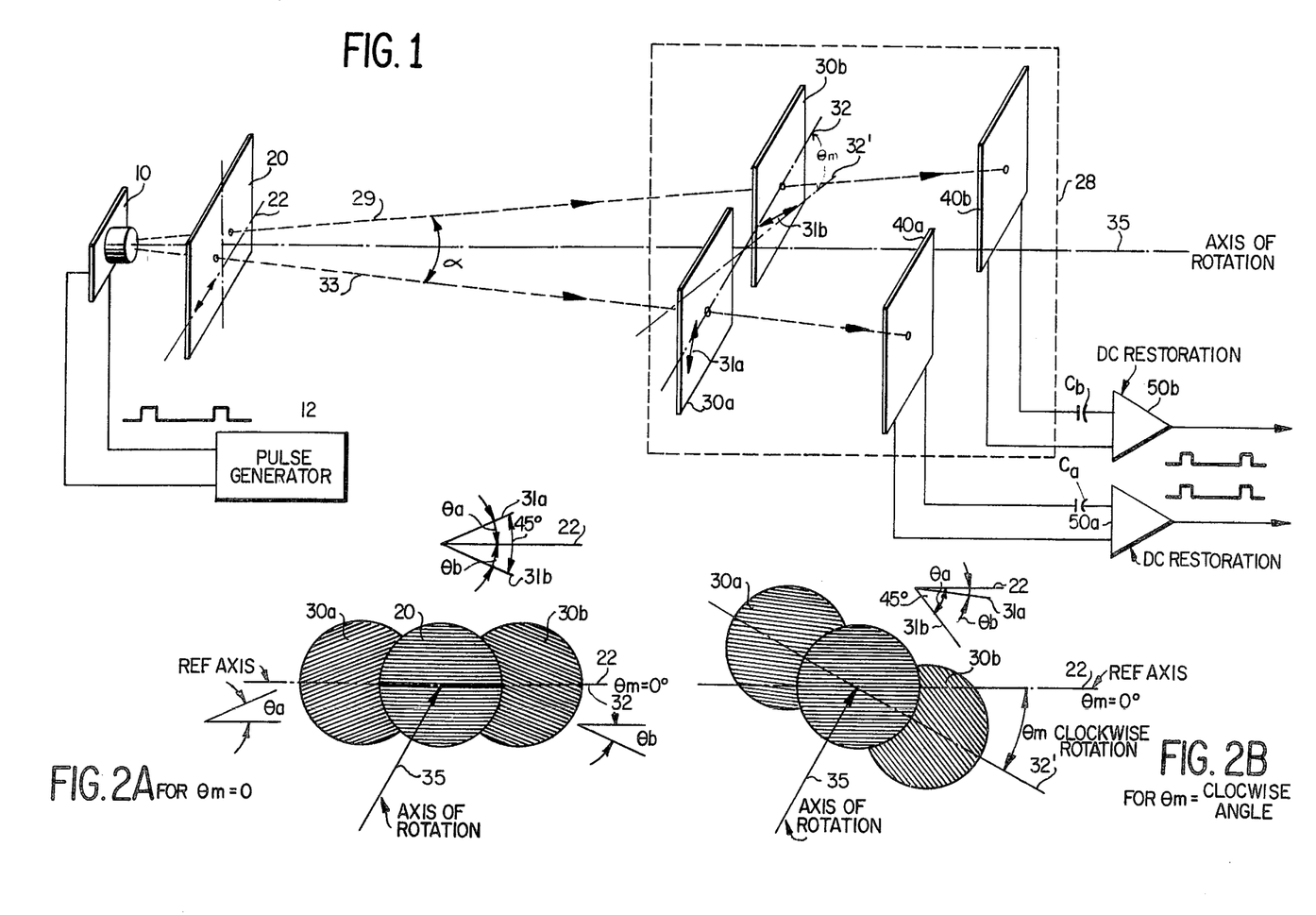
FIG. 1 is an orthogonal schematic representation of a typical angle measuring system according to the present invention.
FIGS. 2A and 2B are geometric representations of polarizer elements showing angular relationships between elements.

Referring to FIG. 1, a typical system according to the present invention is shown including a suitable radiation source such as light emitting diode (l.e.d.) 10 which is controlled by a pulse generator 12 providing a pulsed source of non-polarized light. A first polarization means 20 comprises a transversely mounted linear sheet polarizer, shown with its polarization axis represented by arrows disposed horizontally along axis 22. Polarizer element 20 provides a reference position polarizer means usually mounted normal to the paths of electromagnetic radiation for plane polarizing the waves in a reference orientation. Second polarization means includes a first polarization analyzer 30a and a second polarization analyzer 30b mounted together on a rotatively movable receiving assembly 28. The receiving assembly 28 is rotatively mounted with respect to the first polarizer element 20 and includes an assembly axis 32 that forms an angle $\theta_m$ with respect to the axis 22 of the first polarization means 20.

Associated with each of the polarization analyzers 30a and 30b are means responsive to the electromagnetic waves for generating first and second electrical output signals from corresponding first and second detectors 40a and 40b. The polarization analyzers 30a and 30b, and the detectors 40a and 40b are mounted in a fixed relation to each other to form the receiving assembly 28 as indicated by the dotted line in FIG. 1 and are rotatable about axis 35. The electrical output signals represent the intensity of modulated waves received by each of the first and second detectors along paths corresponding to each of first and second analyzers. The electromagnetic wave detectors can comprise photosensitive laminates mounted in overlying adjacent or contacting relationship with the rotatable analyzers 30a and 30b to form a unitary receiver assembly. In an illustrative embodiment of this invention, each of the electromagnetic wave detectors 40a and 40b may be comprised illustratively of a plurality, typically one to ten, of sensors connected in-parallel with each other to provide an output to its respective amplifier 50a or 50b. Further, the plural sensors of each detector 40a and 40b may be arranged coplanarly in a matrix made up of lines and columns of both sensors, with the sensors of the detector 40b interlaced with sensors of the detector 40a. In such an embodiment, the polarization analyzers 30a and 30b are interposed between the source 10 and the coplanar matrix so as to overlie the matrix of sensors. The polarization axis of each sensor element of the composite detector 40a shall be aligned to form the same angle with the axis 22, and similarly, each element in composite detector 40b shall be aligned to form the same with axis 22.

Figure 5A:
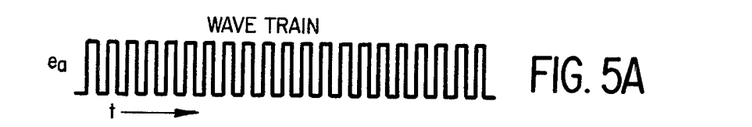
FIGS. 5A and 5B are graphical showings of the pulse signals derived from the detectors.
Figure 5B:
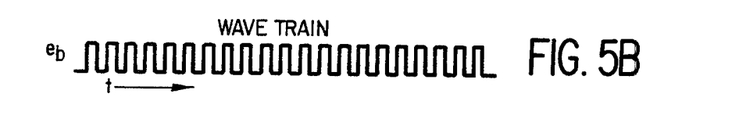

Referring now to FIGS. 2A and 2B, the polarization means 20 is depicted respectively with its angular relationship to the second polarization means and assembly 28 comprising first analyzer 30a and second analyzer 30b, for $\theta_m = 0°$ and for the situation where the axis of assembly 28 is rotated to coincide with line 32'. At any rotated angular position in a parallel plane, the polarization axes 31a and 31b of analyzers 30a and 30b each form an included angle $\theta_a$ and $\theta_b$, respectively with the horizontal polarization axis 22 of first polarizer means 20, and the axis 32 of the assembly 28 forms the $\theta_m$ angle with the axis 22. Transmission constants $K_1$ and $K_2$ are held to matching values in adjacent analyzers, and properly matched sensors have light intensity-to-voltage characteristics, and loading and amplification to provide voltages $e_a$ and $e_b$ (see FIGS. 5A and 5B) proportional respectively to their transmittances $T_a$ and $T_b$. The transmittances $T_a$ and $T_b$ are functions of cos $2\theta_a$ and cos $2\theta_b$ and each of the sensor outputs $e_a$ and $e_b$ is a measure of its angular relationship to the orientation of reference polarizer 20. The analyzers 30a and 30b are kept small in area and located close to each other so that angle $\alpha$ between the light paths 29 and 33 to the detectors 40a and 40b, be kept as close to zero as possible, and the analyzers may be arranged as an array, as shown, to minimize the angle $\alpha$.

Figure 3:
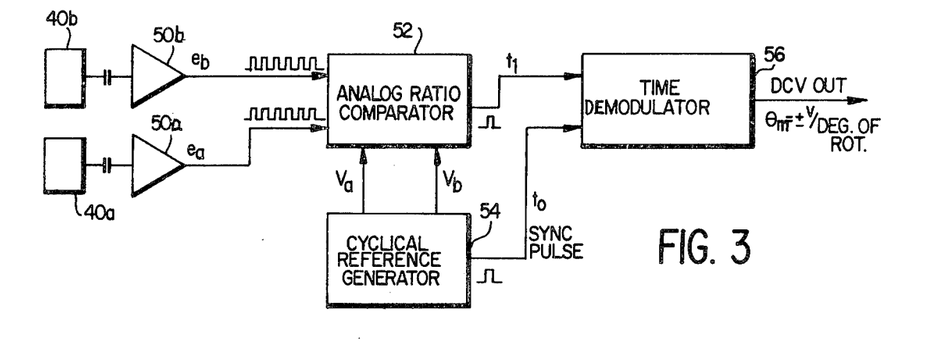
FIG. 3 is an overall block diagram of the circuitry for processing output signals derived from the detectors as shown in FIG. 1.
Figure 5C:
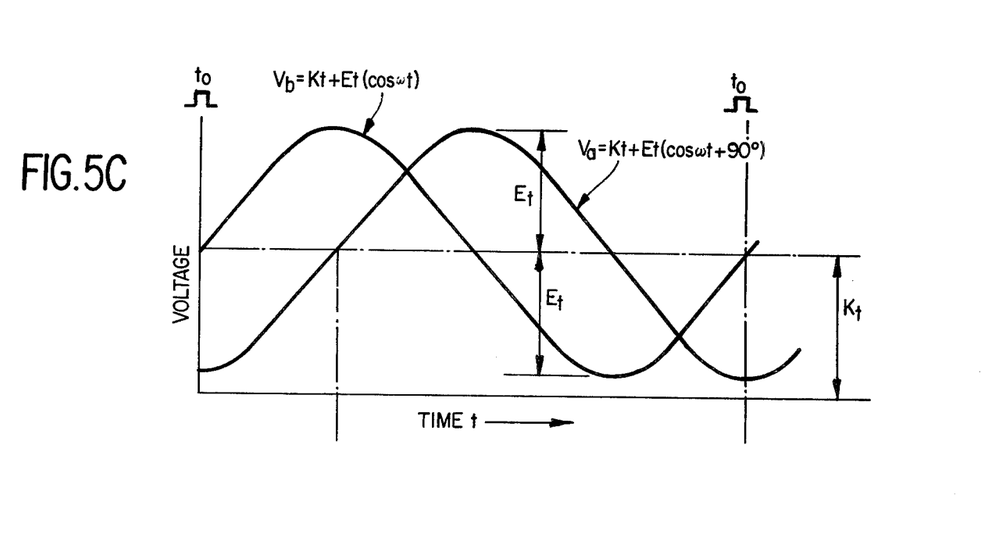
FIG. 5C shows the cosinusoidal reference signals against which the pulse detectors' signals are compared.

Referring to FIG. 3, means are provided which are responsive to the output signals for determining the amplitude ratio $e_a/e_b$ of the output signals. The output signals from detectors 40a and 40b are adapted for computation by applying their electrical outputs through coupling capacitors $C_a$ and $C_b$ to substantially identical amplifiers 50a and 50b, respectively. DC restoration is provided to amplifiers 50a and 50b for determining a reference for measuring the variable pulse amplitudes. Pulsed output signals $e_a$ and $e_b$ are representative of light intensity received by the corresponding detectors 40a and 40b. The pulsed output signals $e_a$ and $e_b$ are applied to an analog ratio comparator 52. Further, a pair of sinusoidal reference signals $v_a$ and $v_b$ as shown in FIG. 5C is generated by a cyclical reference generator 54 to be applied to the analog ratio comparator 52. The cyclical reference generator 54 also provides a synchronizing pulse output (see FIG. 5E) at times $t_o$ identifying a reference point in time common to both of the reference signals $v_a$ and $v_b$. The output of the analog ratio comparator 52 and the cyclical reference generator 54 both are applied to a time demodulator 56. The computation of rotational angle $\theta_m$ is a relatively simple process of analog comparison of the ratio, $e_a/e_b$, and a generated, repetitively-cycled, variable reference ratio $v_a/v_b$. At each intra-cycle time of ratio amplitude equality, the analog ratio comparator 52 generates a mark-timing pulse which can be converted by standard time demodulation techniques by the time demodulator 56 from a time delay to a direct current or voltage representing the angle of rotation, as shown in FIG. 3. The time demodulator 56 measures the intra-cycle time $\Delta_t$ between the occurrence of the sync pulse at time $t_o$ and the occurrence of the pulse output from the analog ratio comparatorr at $t_1$ to provide the indication of the angle of rotation. Basic computation is direct reading by analog waveform comparison techniques.

The fixed angle between adjacent analyzers 30a and 30b is represented by the additive expression $\theta_a - \theta_b$ and is chosen optimumly to be 45° to obtain a wide usable rotational angle $\theta_m = \pm 67.5°$. A fixed 45° angle also simplifies the ratio comparison since reference signals $v_a$ and $v_b$ are 90° out-of-phase for this condition, and making it a convenient set of reference cosine waves to generate. The reference angle between $v_a$ and $v_b$ should be 2[ $\theta$ a l $\theta_b$] for the system to be properly operative. If ($\theta_a - \theta_b$) is made some other value from 0° to 90° then the reference angle is adjusted to 2($\theta_a - \theta_b$), but the angular coverage will diminish to unusable values as ($\theta_a - \theta_b$) approaches 0° or 90°. Thus, the fixed angle between adjacent analyzers is greater than 0° and less than 90°, as shown in FIGS. 2A and 2B.

Figure 4:
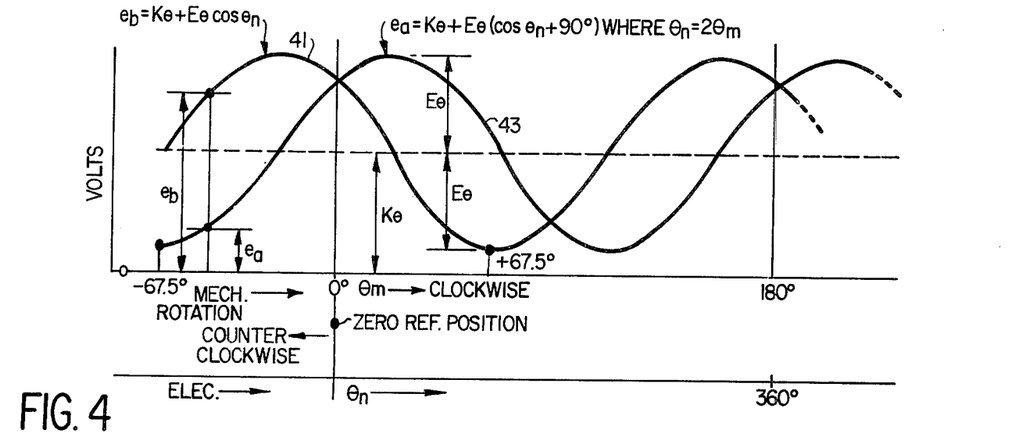
FIG. 4 is a graphical showing of the envelopes of the outputs of the detectors for varying angles $\theta_m$ of rotation between an emitting source and a receiving assembly.

In FIG. 4, there is shown first and second envelopes 41 and 43 of the pulse signals as derived from the detectors 40b and 40a, respectively, as a function of varying the physical angle $\theta_m$ between the emitter source and in particular the axis 22 of the first polarization means 20, and the axis 32 of the receiver assembly 28. Corresponding envelopes 41 and 43 of the electrical pulsed output amplitudes $e_b$ and $e_a$, when plotted against actual mechanical rotation of the receiver assembly 28, generate two smoothly varying functions displaced from each other as shown in FIG. 4. As previously stated, the light transmittance of two parallel sheet polarizers varies as the cosine of twice the mechanical angle $\theta_m$ of rotation. Therefore, the plotted envelopes 41 and 43 are cosine functions with an associated plotted electrical displacement angle $\theta_n$, which is twice the actual mechanical angle $\theta_m$. $\theta_n$ is a single valued function of the ratio of $e_a$ to $e_b$ over the mechanical rotation limits of ±67.5°. This ratio is determined by the analog ratio comparator 52. Further, $\theta_n$ is indicative of the mechanical angle of rotation $\theta_m$ between the axis 22 of the reference polarizer source and the reference line 32 of the polarization analyzers 30a and 30b of the assembly 28 being twice the value of $\theta_m$.

In order to determine the angle $\theta_n$, two continuous reference cosinusoidal time functions $v_a = K_t + E_t\cos\omega t$ and $v_b = K_t + E_t\cos(\omega t + 90°)$ separated from each other by an angle of 90° are generated as shown in FIG. 5C at a frequency considerably less than that of the pulse energizing signal repetition rate as applied to the radiation-emitting source 10. Further, the amplitudes of the sinusoidal signals $v_a$ and $v_b$ as shown in FIG. 5C are substantially equal. The refernce signals $v_a$ and $v_b$ have the same relationship to each other in the time domain as the $e_a$ and $e_b$ envelopes 43 and 41 have in the mechanical or rotational domain. As shown in FIGS. 4 and 5C, $K_\theta$ is the zero bias or reference voltage about which the $e_a$ and $e_b$ envelopes 43 and 41, each having a maximum amplitude $E_\theta$, vary, while $K_t$ is the reference or bias voltage about which the reference voltages $v_b$ and $v_a$, each having a maximum amplitude $E_t$, vary. $K_\theta$ is a function of the transmissive characteristics of the polarized material of which the first and second polarization means are made. The reference or bias voltages $K_t$ and $E_t$ are set to meet the following equation:

$$\frac{K_t}{E_t} = \frac{K_\theta}{E_\theta} \tag{1}$$

$E_\theta$ is a function of the characteristic entire system as shown in FIG. 1, including those of the light source 10, the first and second polarization means 20, 30a and 30b, and the detectors 40a and 40b. Generally, the purpose for generating reference signals $v_a$ and $v_b$ similar to the envelopes 41 and 43 of the pulse signals $e_b$ and $e_a$, is to provide a method of determining the voltage ratio $e_a/e_b$ for rotational angle $\theta_n$ by direct comparison with the corresponding ratio of the reference signals $v_a/v_b$ at a similar point in the intracycle time. As a result, it is possible to detect the point in time $t_l$ at which the ratios are equal, whereby the rotational angle $\theta_m$ is measured by time demodulation methods, as will be explained.

Therefore, it is desired to determine the intracycle or time period $\Delta_t$ from a reference point $t_o$ in time to a subsequent point in time $t_l$ when the ratio of the amplitudes of the pulses $e_a$ and $e_b$ derived from the detectors 40a and 40b and the ratio of the sinusoidal reference signals $v_a$ and $v_b$ have the following relationship:

$$\frac{e_a}{e_b} = \frac{v_a}{v_b} \tag{2}$$

By suitable manipulation, equation (2) may be expressed as follows:

$$e_a(v_b) = e_b(v_a) \tag{3}$$

Figure 5D:
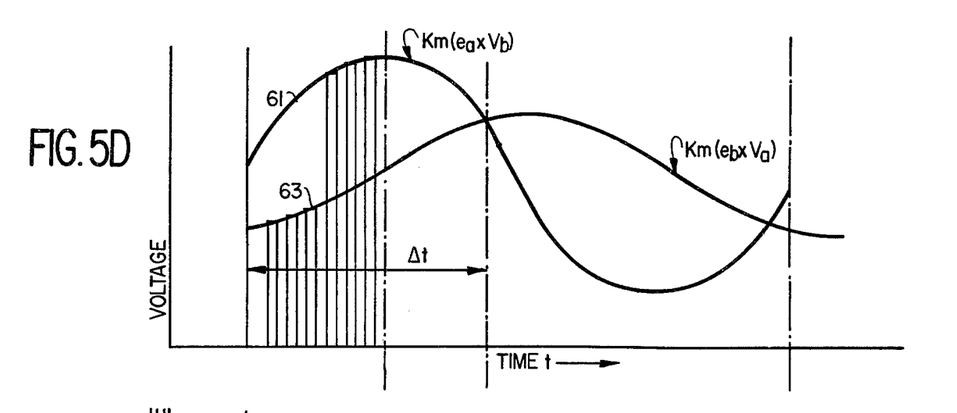
FIG. 5D shows the envelopes of the product signals derived from the multipliers shown in FIG. 6, FIGS. 5E and 5F show, respectively, the pulse reference signal indicative of $t_o$ as derived from the cyclical reference generator of FIG. 7 and the equality signal as derived from the amplitude window detector of FIG. 6, and FIGS. 5G, 5H and 5I are, respectively, the outputs of the sawtooth generator, time modulator and peak detector of the system shown in FIG. 7.
Figure 5E:
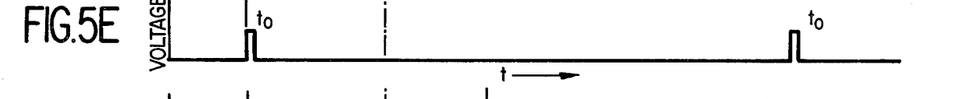
Figure 5F:
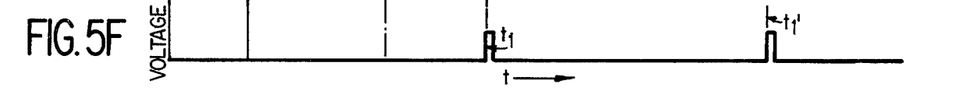

Equation (3) is solved in the analog ratio comparator 52 and at the point when the equation is met, a pulse is generated at time $t_l$ as indicated in FIG. 5F, as will now be explained more fully with respect to FIGS. 6 and 7.

Figure 6:
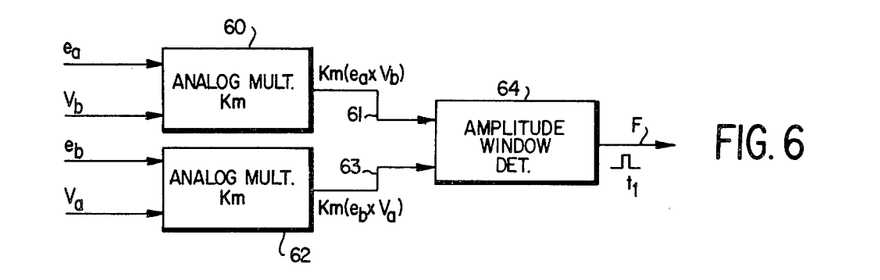
FIG. 6 shows diagrammatically the circuit details of the analog ratio comparator as shown in FIG. 3.

In FIG. 6, the signals $e_a$ and $v_b$ as derived from the amplifier 50b and the cyclical reference generator 54, respectively, are applied to an analog multiplier 60 for multiplying the two input values together and by a constant term $K_m$ to provide an output $K_m(e_a \times v_b)$. In a similar manner, the signals $e_b$ and $v_a$ are applied to an analog multiplier 62 to derive an output of $K_m(e_b \times v_a)$. In turn, the outputs of the analog multipliers 60 and 62 are applied to an amplitude window detector 64, which derives a pulse output at time $t_l$; as shown in FIG. 5F, $t_l$ is defined as the time at which outputs 61 and 63 are equal. Time demodulation of the pulsed output of the amplitude window detector 64 at time $t_l$ in effect solves equation (3), given above, and determines the electrical angle $\theta_n$, which in turn defines the mechanical angle $\theta_m$ between the reference lines 22 and 32 in accordance with the relation $\theta_n = 2\theta_m$.

Figure 5G:
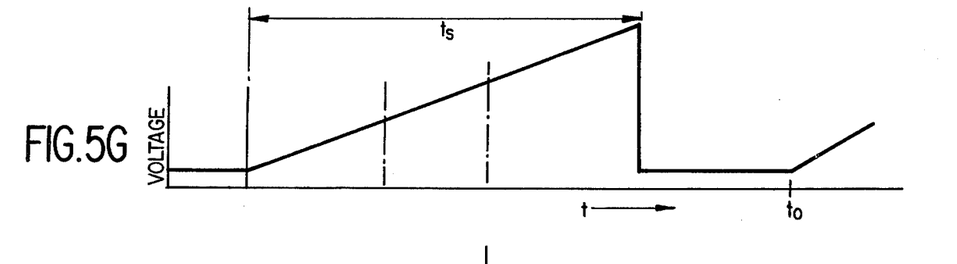
Figure 5H:
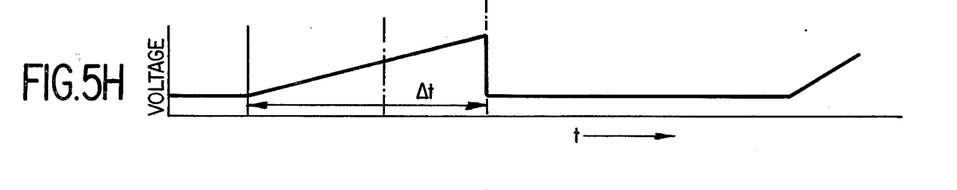
Figure 5I:
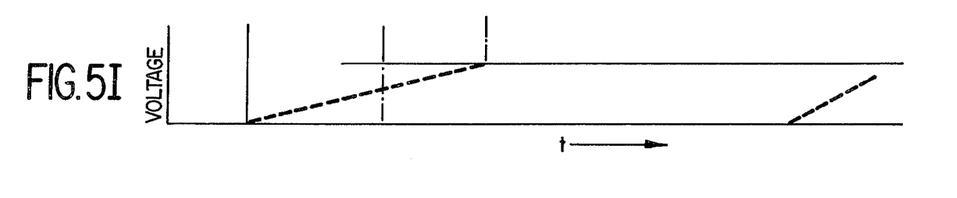
Figure 7:
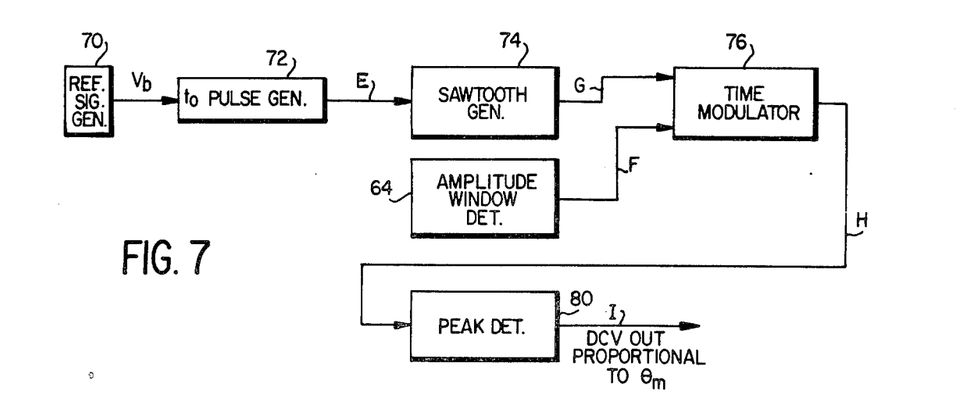
FIG. 7 is a diagrammatical showing of the detailed circuits of the time demodulator as generally shown in FIG. 3.

In FIG. 7, there is shown the detailed circuitry of the time demodulator 56, more generally shown in FIG. 3, and letters E, G, F, H and I are used therein to identify the signals shown in FIGS. 5E, 5G, 5F, 5H and 5I, respectively. The time demodulator 56 is responsive to the pulse signals $t_o$ indicative of the time reference point and the pulse signals indicative of the occurrence at time $t_l$ (see FIG. 5D) of equality between the ratios $v_a/v_b$ and $e_a/e_b$, to determine the time period $\Delta_t$ between $t_o$ and $t_l$ and to provide a signal indicative thereof which corresponds to the value $\theta_n$. As shown in FIG. 7, the cyclical reference generator 54 includes a reference signal generator 70 for providing either of the cosine signals $v_b$ or $v_a$ as shown in FIG. 5C. Illustratively, the generator 70 generates and applies the cosine signal $v_b$ to a pulse generator 72 which responds to the passage of the sinusoidal signal $v_b$ across the zero reference line in a positive direction to generate a series of reference signals $t_o$ as shown in FIG. 5E. In turn, the train of reference pulses $t_o$ is applied to the time demodulator 56 and in particular to a sawtooth generator 74, which generates a series of sawtooth waveforms as shown in FIG. 5G. Further, the pulse output of the amplitude window detector 64 occurring at time $t_l$ is applied to the time demodulator 56 and in particular to the time modulator circuit 76, which functions to control the width $\Delta_t$ of the sawtooth waveform upon the occurrence of the pulse at time $t_l$. The sawtooth time delay $t_s$ is chosen to correspond in the time domain to the rotational angular limits of interest ($\pm 67.5°$). This prevents false signals $t_l'$, as shown in FIG. F, from affecting the computation since the sawtooth waveform does not exist at time $t_l'$. The resultant width-modulated sawtooth waveforms (see FIG. 5H) as derived from the time modulator circuit 76 are applied to a peak detector 80 to provide a DC output signal (see FIG. 5I) indicative of the amplitude of the input waveforms; in turn, this amplitude is an indication of the period between $t_l$ and $t_o$, i.e., the mechanical angle $\theta_m$.

Figure 8:
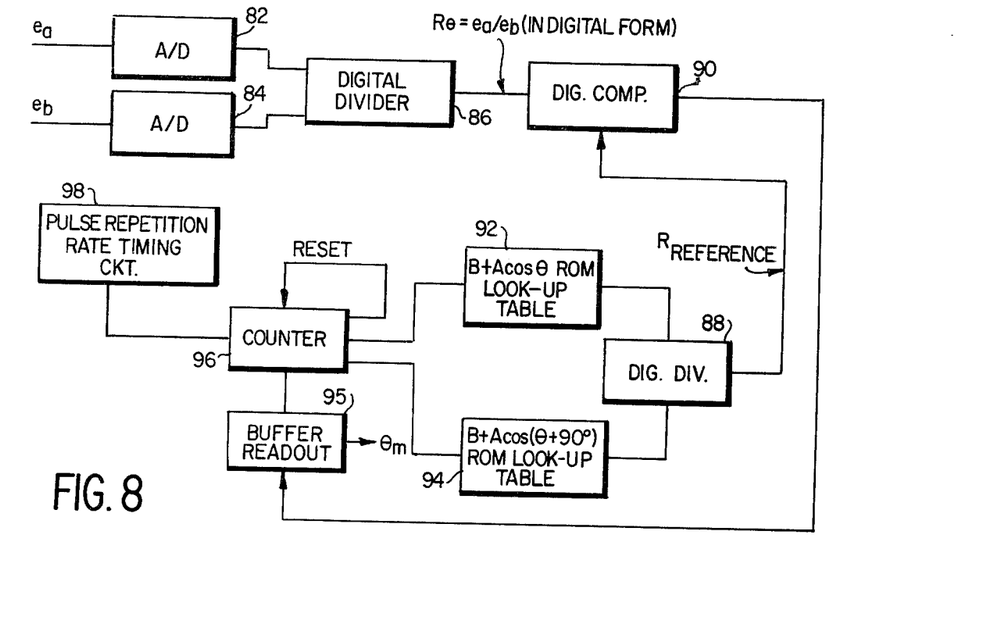
FIG. 8 is an alternative embodiment of this invention employing digital components.

As shown in FIG. 8, an alternate embodiment of the electronic processing of the voltage signals $e_a$ and $e_b$ derived from the detectors 40a and 40b is carried out in a digital fashion. In particular, the voltage signals $e_a$ and $e_b$ are applied to analog-to-digital (A/D) converters 82 and 84, respectively, to provide corresponding outputs in digital form. The resulting digital outputs are applied to a digital divider circuit 86 to obtain the digital ratio $R_\theta$ corresponding to $e_a/e_b$. In order to solve equation (2) in a fashion analogous to that explained above with regard to the analog implementation of FIGS. 6 and 7, a ratio signal indicative of the ratio between a digitized reference signal $v'_b$, taking the form of a B + Acos($\theta$) signal, and a $v'_a$ signal, taking the form of a B + Acos($\theta$ + 90°) is generated by digital divider 88, whose output is a digital ratio signal $$R_{REFERENCE} = \frac{B + A\cos(\theta + 90°)}{B + A\cos(\theta)}.$$

More specifically, the reference signals $v'_b$ and $v'_a$ are generated, respectively, by read-only-memories (ROM's) 92 and 94, which are programmed with trigonometric look-up-tables to generate in digital form the B + Acos($\theta$) and the B + Acos($\theta$ + 90°) signals in response to sequenced addresses applied by a counter 96. In a manner similar to that required in the analog embodiment, the trigonometric functions programmed into the ROM's 92 and 94 must satisfy the following equation:

$$\frac{B}{A} = \frac{K_\theta}{E_\theta} \quad (4)$$

similar to equation (1) above, in order to render significant the comparison of the digital ratios. The ROM's 92 and 94 are programmed to have a discrete and equal number of addresses so that after a complete synchronized scan of the look-up-tables, the counter 96 resets itself to initiate counting again in response to a periodic start signal provided by pulse repetition rate timing circuit 98. At the time $t_l$ of equality of $R_\theta$ and $R_{REFERENCE}$, the digital comparator 90 generates and applies a read-load signal to a buffer read-out 95. The resultant output of the buffer represents the rotational angle $\theta_m$ in digital form. The angle $\theta_m$ is related directly to the number of counted pulses from the start of scan.

Figure 9:
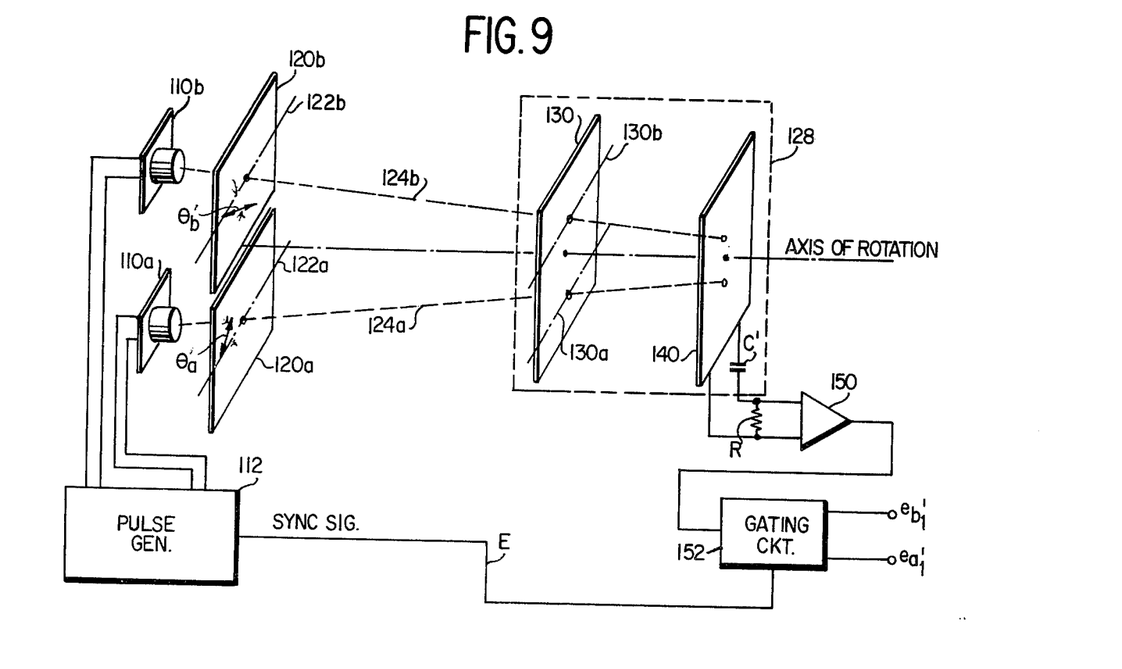
FIG. 9 is an orthogonal schematic representation of a further embodiment of this invention employing two radiation sources and but a single detector.

In a further embodiment of this invention as shown in FIG. 9, first and second pulse light sources 110a and 110b, illustratively taking the form of light-emitting diodes, are energized alternatively by pulses generated by an alternating pulse generator 112, whereby distinct, non-polarized electromagnetic waves are directed along separate paths 124a and 124b, respectively. These alternate pulses of radiation are polarized in two distinct reference orientations by passing through adjacent reference position polarizers 120a and 120b. As illustratively shown in FIG. 9, the polarizer 120a serves to polarize the light emitted from the radiation source 110a in an orientation corresponding to the arrow displaced an angle $\theta_a'$ from a reference line 122a and in a similar manner, the reference position polarizer 120b serves to polarize the pulse radiation emitted from the source 110b in an orientation as shown by the arrow displaced from a reference line 122b by an angle $\theta_b'$. It is noted that the reference lines 122a and 122b are essentially parallel with each other. In a manner similar to that explained above, the orientation of polarization as indicated by the aforementioned arrows of the polarizers 120a and 120b are angularly displaced from each other by an optimum angle of 45°. The alternately-pulsed radiation is passed through a single polarization analyzer 130 onto a single radiation detector 140, the output of which develops a voltage signal across the resistance R. The alternate voltage pulsed signals are amplified by an amplifier 150 and applied to a gating circuit 152 operative in response to sync signals derived from the generator 112, to separate the signals resulting from the alternating pulses of radiation to provide distinct outputs $e_b'$ and $e_a'$. The output signals $e_b'$ and $e_a'$ may be processed in a manner(s) similar to that as explained above with respect to FIGS. 3, 6 and 7, and 8.

While particular emphasis is given to those embodiments employing light, the electromagnetic spectrum contains several bands which can be plane polarized. Existing electromagnetic sensors and polarizers are available for the visible portion of the spectrum, as well as infrared, ultraviolet and microwave applications.

The light source may be an incandescent lamp or other means for emitting broad band light. Preferred sources for visible and infrared waves comprise narrow band or monochromatic light-emitting diodes (l.e.d.), well-known in the art. A pulsed l.e.d. peaked at about 9,000A is preferred as a source. The electromagnetic source and/or sensor may be provided with means, such as dichroic filters, for transmitting selected portions of the electromagnetic spectrum. A preferred embodiment of the transmitter assembly contains a pulsed light-emitting diode (l.e.d.) peaked at about 9,000A and radiating through an oriented first plane polarizer to direct electromagnetic waves toward a detector. The l.e.d. output can be concentrated into a relatively narrow beam by means of an integral lens.

The radiation source should be substantially unpolarized. Ordinarily, the source of electromagnetic waves is pulsed at a steady rate, for example, in the range of 1KHz to 100KHz with little fluctuation in average intensity. However, alternately pulsed plural sources may be utilized in conjunction with comparator means in the output circuitry.

In its simplest form, a receiver assembly 28 includes a pair of small matched sheet polarization analyzers 30a and 30b arranged in side-by-side relationship and rotatably mounted transverse to the path of the waves directed towards the detectors. The relative orientation of the analyzer pair can be fixed by bonding a coplanar assembly to a movable element such as a helmet. Multiple pairs of such receiver assemblies can be mounted in spaced-apart relationship on the same movable element. This would involve an appropriate array of transmitters and receivers arranged within the limits of rotary motion.

The requirements of an illustrative optical system are relatively simple. Included in the operatively-connected system are means for projecting randomly polarized electromagnetic waves from a source along a plurality of paths to a corresponding plurality of electromagnetic detectors. Along the paths, the electromagnetic waves are modulated by a pair of linear polarizers, mounted as a fixed index, movable reference, or independently movable target. The polarizers may be mounted in a position normal to the path of rays (angle of incidence = 0), or the polarizers may transmit the waves at incident angles up to the Brewsterian angle of the polarizer materials. For typical sheet-type optical polarizers, an angle of incidence from 0° up to about 67° is operative. The optical paths should be clear of additional elements which induce undesired polarization. The target and reference polarizers can be remotely located with ease as by the use of a telescopic lens assembly.

One advantage of the proposed system is that it permits computation, except for signal to noise effects, which is independent of the absolute pulsed light output level. This is due to the matching of receiver channels which responds proportionally to level changes to maintain the same ratio for any angular rotation $\theta_m$. If sufficient dynamic range is employed for the detector assembly, the absolute value of the ambient light, being a relatively slow-changing function compared to pulse repetition frequency, can be viewed as essentially a steady state term.

Several practical applications of this system are suggested. Shaft angle or other rotational motion may be measured without mechanical linkage to a remotely located instrument. The requirements for use are a clear optical path and the capability for affixing a piece of illuminated sheet polarizer to the shaft end or otherwise operative with the plane of rotation. Illumination sources include pulsed ambient light and pulsed waves provided by external projection means. There are considerable advantages over mechanical coupling of lowered weight, mechanical backlash, and shaft friction for the optical method. Because optical coupling may be by means of telescopic lens, the word remote has literal meaning in that the sensor may be located at extreme distance. The new system can be utilized as a basic sensor for a helmet sight used for operator head-motion control of weapon systems or radar antenna positioning systems. This would include both airborne and surface applications and would be applicable horizontally or vertically to any rotary military device requiring directional operator control. Hands-free operation allows the operator to perform other manual tasks. An associated head-mounted optical sight may be used for accurate positioning.

The system is especially useful in high-speed aircraft to determine line-of-sight angles with the aircraft reference axes to another aircraft or ground point as viewed by a crew member. The measurement of these angles using an operator headmounted angle monitor can be used to automatically aim such devices as radar antennas, missile seekers or other airborne sensors and weapons in the exact direction of the viewed object. The line-of-sight angles in each of the three aircraft axes (roll, pitch and yaw) can be related by using separate sets of head-mounted receiver-polarized sensor pairs and reference aircraft-mounted polarized transmitter in each axis. For use in an aircraft canopy, the radiation means and first polarizer means can be integrally mounted as a fixed index transmitter assembly on the canopy wall. In the case of a helmet mounted polarization detector, a pair of polarization analyzer sheets can be mounted in overlying relationship with a corresponding pair of substantially flat electro-optical sensors to form a receiver assembly mounted on the helmet. Each analyzer in the receiver assembly is fixed with respect to each other, even though the assembly is attached to a movable body such as a helmet and can rotate as a monolithic structure.

In adapting the invention for controlling a mechanical rotation in response to motion of the head or other rotary member, a linear polarizer is mounted so as to direct a polarized wave from a transmitter position to the detector. For instance, a first linear polairzer and associated radiation source can be mounted on a helmet, with the polarizer sheet disposed horizontally or vertically. A second remote linear polarizer assembly can be used as a fixed index or reference. The output signals representative of the two polarizers can be adapted to drive or command the mechanical position of the device being aimed. Alternatively, the head-mounted polarizer can be used as the reference with a polarized radiation being directed from the aimed device and an output from the phase measuring equipment being utilized in a nulling mode to effect a master/slave system.

An industrial equivalent to the military helmet sight would be extremely useful in controlling various fixtures, tools, machinery, such as cranes and heavy equipment which move through angle rotation by electrical command.

The output of the signal ratio measuring unit can be adapted to control drive electrical or electrohydraulic servo mechanisms. A nulling-type closed loop servo system can be utilized with reference/target in a master/slave relationship in numerous environments.

While the invention has been described by reference to particular examples, there is no intent to limit the inventive concept except as set forth in the following claims.

What is claimed is:

1. An electro-optical system for measuring angular rotation which comprises:
   means for providing a pulsed source of non-polarized light;
   first linear polarizer means;
   a plurality of second linear polarizer means mounted adjacent one another in a common plane and being angularly disposed about an axis of rotation and substantially fixed with regard to their respective directions of linear polarization;

means for directing light along a plurality of paths through said first polarizer means and said plurality of second polarizer means;

photosensor means for detecting light along each of said plurality of paths from said first polarizer means and said plurality of second polarizer means and for providing output signals representative of light intensity received by said photosensor means; and processing means responsive to said output signals of said photosensor means for determining equality between the amplitude ratio of output signals corresponding to adjacent polarizer means and a reference value and generating a signal representative of rotation angle between said first polarizer means and said plurality of second polarizer means when said equality occurs.

2. The system of claim 1 wherein adjacent second polarizer means are disposed at a fixed mechanical angle greater than 0° and less than 90°.

3. The system of claim 1 wherein adjacent second polarizer means are disposed with their respective mechanical axes of polarization direction at substantially 45°.

4. The system of claim 1 wherein the pulsed source comprises pulsed light-emitting diode means.

5. The system of claim 4 wherein there is included energizing means for applying pulse signals to said diode means.

6. The system of claim 1 wherein said first and second polarizer means comprise sheet polarizers mounted transversely between the plurality of the paths.

7. The system of claim 1 wherein the plurality of second polarizer means comprises a pair of matched polarizer sheets mounted in fixed coplanar relationship on a rotatable body.

8. The system of claim 7, wherein the pulsed source and first polarizer means are integrally mounted as a fixed index transmitter assembly.

9. The system of claim 7, wherein said pair of polarizer sheets is mounted in overlying relationship with a corresponding pair of substantially flat electro-optical sensors to form a receiver assembly.

10. The system of claim 1, wherein said pulsed source polarizer means, and photosensor means comprise matched narrowband spectral width emitter and receiver portions.

11. The system as claimed in claim 1, wherein said pulsed source means and said plurality of second linear polarizer means comprise a first assembly mounted at a reference position, said pulsed source means comprising first and second devices for emitting light along the paths through corresponding ones of said second linear polarizing means; and a second assembly comprising said first linear polarizer means and said photosensor means mounted rotatively with respect to the first assembly and fixed with respect to each other.

12. The system as claimed in claim 11, wherein said processing means further comprises gating means for separating the signals generated in response to the light emitted from the first and second devices onto said photosensor means.

13. The system as claimed in claim 1, wherein said processing means comprises analog-to-digital converter means for converting the analog outputs of said photosensor means into digital form, divider means for providing a digital output signal indicative of the amplitude ratio of the output signals of said photosensor means, read-only memory (ROM) means programmed to provide corresponding first and second outputs in digital form indicative of cyclical signals displaced from each other by a given angle $\theta$, means for providing in digital form a manifestation of the ratio of the first and second outputs, and digital comparator means for providing an indication of equality between the reference signals as derived from said ratio providing means and said divider means.

14. The system as claimed in claim 13, wherein there is further included counter means for generating and applying an address signal to each of said first and second ROM means, and means coupled to said counter and responsive to the output of said digital comparator means to provide a digital output signal indicative of the angular rotation.

15. Apparatus for measuring rotational angle of a movable target element with relation to a reference position, said apparatus comprising:

means for directing non-polarized electromagnetic waves along paths toward first and second electromagnetic wave detectors;

reference position polarizer means mounted transverse to the paths for polarizing the waves in a reference orientation;

first and second polarization analyzers rotatably mounted on the movable target element in a common plane transverse to the paths between said reference position polarizer means and said first and second detectors, said first and second analyzers being disposed adjacently to provide a fixed angle greater than 0° and less than 90° between polarization directional axes of said first and second adjacent analyzers, said first and second detectors being responsive to the electromagnetic waves for generating first and second output signals representing the intensity of the waves received by each of said first and second detectors along paths corresponding to said first and second analyzers; and means responsive to said first and second output signals from said detectors for determining equality between the amplitude ratio of first and second output signals corresponding to said first and second analyzers and a reference value and generating a signal representative of rotational angle between the movable element and the reference position when said equality occurs.

16. Apparatus according to claim 15, wherein said reference position polarizer means is mounted as a fixed index and includes a polarizer sheet overlying a pulsed light source, thereby forming a transmitter assembly.

17. Apparatus according to claim 15, wherein said processing means comprises reference means for generating first and second cyclical reference signals separated from each other by a given angle and having a common reference point, comparator means for determining when the ratio of the output signals derived from said first and second detectors equals the ratio of the reference signals, and means for determining the time period between the reference point and the point at which the ratio equality occurs to provide an indication of the rotational angle of the movable target element with respect to the reference position.

18. Apparatus according to claim 17, wherein said comparator means includes first multiplier means for multiplying the first output signal by the second reference signal to provide a first product signal indicative thereof, second multiplier means for multiplying the second output signal by the first reference signal to provide a second product signal indicative thereof, and means responsive to the first and second product signals to provide an equality signal of the occurrence of an equality therebetween.

19. Apparatus according to claim 18, wherein said reference means provides a signal indicative of the occurrence of the common reference point, and said determining means comprises generator means for initiating the generation of a ramp signal in response to the occurrence of the reference point signal, and means for limiting the amplitude of the ramp signal as derived from said generator means in response to the occurrence of the equality signal, and means responsive to the limited signal for deriving an indication of its amplitude to provide an indication of the angle rotation between the target element and the reference position.

20. In a device for measuring rotational angle wherein plane polarized light is directed to be received by rotatable polarization analyzer means operatively connected to a remote rotary body for which rotational angle relative to a reference position is measured, the improvement which comprises:
  a plurality of polarization analyzers mounted side-by-side transverse to plane polarized light received by said analyzer means, each of said analyzers having a directional axis of linear polarization;
  means for holding said analyzers to maintain a substantially fixed axial angle between said analyzers about an axis of rotation;
  photosensor means for receiving light independently through each of said analyzers and generating time pulsed electrical signals with amplitude representative of modulated light intensity for each analyzer; and
  means for determining equality between the amplitude ratio of said time pulses electrical signals and a reference value adjacent photosensor signals and generating an output signal representative of rotational angle when said equality occurs.

* * * * *